July 3, 1962 A. B. TWEDT 3,041,636
INVALID LIFTER AND TRANSPORTING DEVICE
Filed Nov. 29, 1960

ARTHUR B. TWEDT
INVENTOR.

BY Ramsey, Kolisch + Hartwell
ATTYS

United States Patent Office 3,041,636
Patented July 3, 1962

3,041,636
INVALID LIFTER AND TRANSPORTING DEVICE
Arthur B. Twedt, 1126 NE. 190th Place, Troutdale, Oreg.
Filed Nov. 29, 1960, Ser. No. 72,502
5 Claims. (Cl. 5—81)

This invention relates to invalid handling equipment, and more particularly to a lifting and transporting device for invalids.

It is an object of the present invention to provide an invalid lifting and transporting device that features a rotatable cylindrical seat, accommodating easy insertion of the seat under an invalid who is in a sitting position.

Another object of the present invention is to provide a lifting and transporting device having a portable frame that is adjustable to suit differences in heights and weights.

Another object of the present invention is to provide such a device having a frame that itself may be used as a lever, using rear wheels in the device as a fulcrum.

Still another object of the invention is to provide a device having a front mounted roller mounted on swingable arms providing for the forward support of an invalid.

A further object of the invention is to provide a transporting device with a novel detachable strap for supporting the rear of an invalid.

Yet another object of the invention is to provide an invalid lifter and transporter, having the above features which is of simple construction, inexpensive to manufacture, and efficient in operation.

For other objects, and for a better understanding of the invention, reference may be had to the following detailed description, taken in conjunction with the accompanying drawing, in which.

Referring now more in detail to the drawings, an invalid lifting and transporting device made in accordance with the present invention is shown at 10, and includes a mobile frame having two side members 12, with these connected at their lower ends by a transverse axle 13. Mounted on axle 13 are two rear wheels 14. Hand grips 15 are mounted adjacent the upper ends of side members 12.

Figure 1:
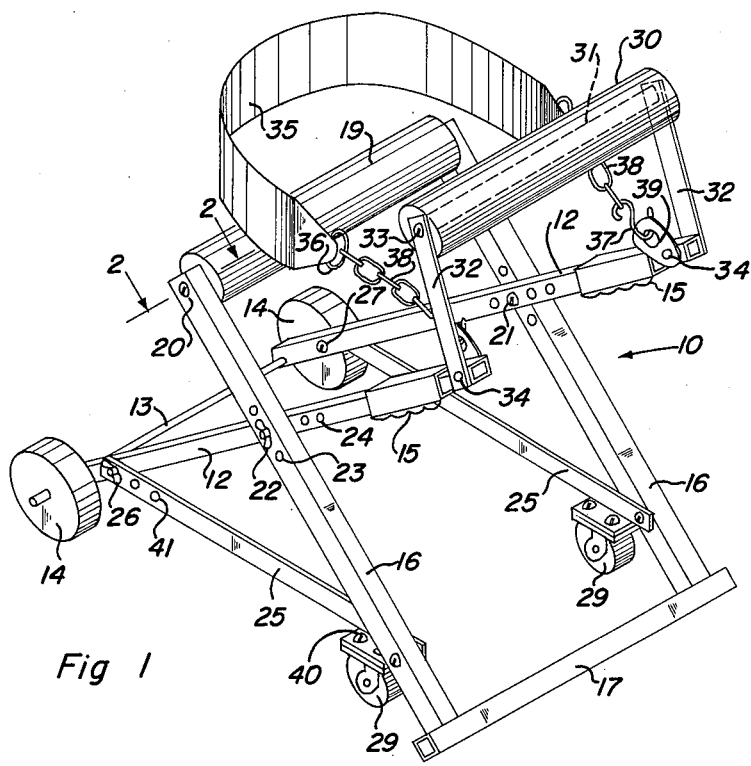
FIG. 1 is a perspective view of the device, built according to one embodiment.
Figure 2:
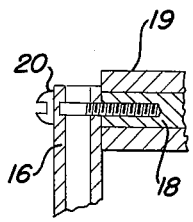
FIG. 2 is an enlarged, fragmentary cross-sectional view, taken along the line 2—2 in FIG. 1.
Figure 3:
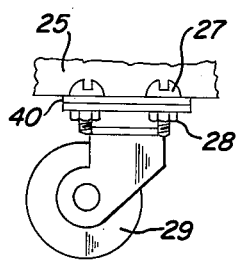
FIG. 3 is a side view, also enlarged, showing a caster in the device and how it is mounted.

Also a part of the movable frame is a rectangularly constructed frame comprising side members 16, a transverse member 17 connecting the lower ends of side members 16, and a rigid member 18 (see FIG. 2) connecting the upper ends of side members 16. Members 16 are connected to transverse member 18 by screws 20 screwed into member 18. A cylindrical or roller-type seat 19 is rotatably mounted on member 18.

Side members 16 cross side members 12 at approximately the middle of members 12. Each is connected where it crosses with a member 12 to the member 12 by a bolt 21 and wing nut 22. A series of holes 23 and 24 are provided accommodating adjustment in the mobile frame.

A horizontal member 25 connects lower ends of a set of side members 12 and 16 on each side of the device. Bolts 27 and wing nuts 26 are used in the connection. A series of holes 41 are provided to accommodate additional adjustment in the mobile frame. Plates 40 secured to horizontal members 25, by welding or other suitable means, and screws 27 and nuts 28 are used in mounting caster 29 under the forward part of the device.

A front mounted roller 30, or support means, is rotatably mounted on a transverse shaft 31, and the latter is fastened to a set of swingable arms 32 by bolts 33 screwed into shaft 31. The swingable arms are fastened to side members 12 by rivets 34.

Completing the description of the device, a flexible strap 35, with D shaped rings 36 secured thereto, is connected to chains 38. Chains 38 terminate in hooks 37, and these pass through eyes 39 which are secured to members 12 by rivets 34.

Figures 4, 5, 6:
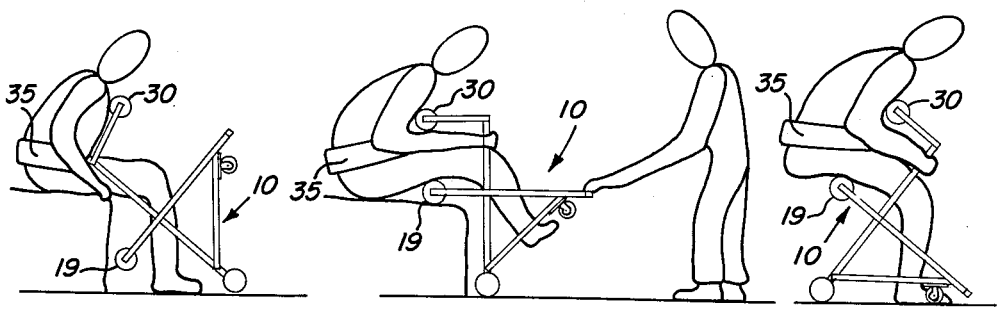
FIGS. 4, 5 and 6 illustrate various steps in the use of the device.

In actual use, the movable frame first may be tipped back, as shown in FIG. 4 so that roller-type seat 19 is near the floor and behind the legs of the invalid to be lifted. Next strap 35 may be placed behind the invalid, and secured to the frame, using hooks 37. Then, as shown in FIG. 5, the device may be rotated forwardly, to enable roller-type seat 19 to be inserted under the invalid. Front mounted roller 30 also then is properly positioned adjacent the front of the invalid. Thence, on further rotation of the device, by pushing down on forward traverse member 17, the invalid is lifted to the position shown in FIG. 6, ready for transport.

While various changes may be made in the construction, it should be understood that such changes are within the spirit of the present invention, if they come within the scope of the appended claims.

It is claimed and desired to secure by Letters Patent:

1. An invalid lifting and transporting device comprising a first pair of substantially parallel and inclined side members, one on each side of said device, a transverse wheel-supported axle connected between the lower ends of said first pair of side members, a second pair of substantially parallel and inclined side members, one on each side of said device and each crossing one of said first pair of side members, means interconnecting the side members on each side of the device adjacent where they cross, a member in tension interconnecting the side members on each side of the device adjacent their lower ends, a rotatable seat extending between and rotatably mounted on the upper ends of said second pair of side members, wheels mounted adjacent the lower ends of said second pair of side members, a swingable arm with an end pivotally connected to the upper end of each of said first pair of side members, and supporting means extending between and connected to said swingable arms.

2. The lifting and transporting device of claim 1, wherein the side members on each side of the device are interconnected adjacent where they cross by means accommodating adjustment in the position of one along the length of the other.

3. The device of claim 1, wherein there is further provided strap means extending between and connected to the upper ends of said first pair of side members.

4. The device of claim 1, wherein the means interconnecting the side members on each side of the device is detachable to accommodate collapsing of the device.

5. A transporting device comprising a frame, front and rear wheel support means for the base of said frame, roller seating means journaled on said frame and positioned above said wheel support means, said seating means being rotatable about a horizontal axis extending transversely of the device, an arm pivoted on said frame on each side of said device having non-pivoted ends in front of said seating means, and support means interconnecting said pivoted arms.

References Cited in the file of this patent
UNITED STATES PATENTS

| | | |
|---|---|---|
| 1,349,674 | Jenkins | Aug. 17, 1920 |
| 1,821,107 | Miles | Sept. 1, 1931 |
| 2,809,047 | Strohmaier | Oct. 8, 1957 |
| 2,872,967 | Kirkpatrick | Feb. 10, 1959 |